United States Patent [19]
Sone

[11] Patent Number: 5,532,923
[45] Date of Patent: Jul. 2, 1996

[54] KARAOKE NETWORK SYSTEM SERVING SPARE EVENTS DURING IDLING TIME

[75] Inventor: Takurou Sone, Hamamatsu, Japan

[73] Assignee: Yamaha Corporation, Hamamatsu, Japan

[21] Appl. No.: 528,747

[22] Filed: Sep. 15, 1995

Related U.S. Application Data

[63] Continuation of Ser. No. 294,444, Aug. 23, 1994, abandoned.

[30] Foreign Application Priority Data

Aug. 31, 1993 [JP] Japan ..................... 5-238836

[51] Int. Cl.$^6$ ............................. G05B 15/02; G10H 7/00
[52] U.S. Cl. ................. 364/138; 84/602; 84/634
[58] Field of Search ..................... 364/131, 138; 84/600, 601, 602, 631, 634, 645

[56] References Cited

U.S. PATENT DOCUMENTS

| | | | |
|---|---|---|---|
| 5,127,303 | 7/1992 | Tsumura et al. | 84/609 |
| 5,153,917 | 10/1992 | Kato | 380/3 |
| 5,250,745 | 10/1993 | Tsumura | 84/603 |
| 5,250,747 | 10/1993 | Tsumura | 84/645 |
| 5,252,775 | 10/1993 | Urano | 84/645 |
| 5,294,746 | 3/1994 | Tsumura et al. | 84/631 |
| 5,357,505 | 10/1994 | Tsumura et al. | 370/60 |

FOREIGN PATENT DOCUMENTS

| | | |
|---|---|---|
| 0427447 | 5/1991 | European Pat. Off. . |
| 667682 | 3/1994 | Japan . |
| 6102892 | 4/1994 | Japan . |
| 2276754 | 10/1994 | United Kingdom . |

*Primary Examiner*—Paul P. Gordon
*Attorney, Agent, or Firm*—Loeb & Loeb

[57] ABSTRACT

A karaoke network system is composed of a central station for providing a data, and a local terminal connected to the central station through a communication line; for presenting an event according to the provided data and being switchable between a working state and an idling state in response to a request. The central station responds to a call from the local terminal for providing a song data representative of a karaoke event to the local terminal through the communication line. The central station further down-loads a program data which sequentially prescribes spare events into the local terminal through the communication line. The local terminal operates in the working state where a request is present for presenting the karaoke event based on the provided song data, and otherwise operates in the idling state where a request is absent for sequentially presenting the spare events according to the down-loaded program data so as to fill a blank period of the idling state.

18 Claims, 2 Drawing Sheets

KARAOKE NETWORK SYSTEM SERVING SPARE EVENTS DURING IDLING TIME

This is a file wrapper continuation application of Ser. No. 08/294,444 filed Aug. 23, 1994, now abandoned.

BACKGROUND OF THE INVENTION

The present invention relates to a karaoke network system composed of a central station for serving a song data, and local stations each connected to the central station through a communication line for presenting a karaoke event in response to a request according to the served song data. More specifically, the present invention relates to a karaoke network system operative to fill an idling time when a request is absent.

A conventional karaoke apparatus is basically constructed to sound through a loudspeaker an instrumental accompaniment of a requested song, which is mixed with a live vocal performance, while lyric characters of the requested song are displayed on a monitor. The karaoke apparatus is widely spread while its performance improves more and more. For example, a background picture is displayed on the monitor during the vocal play for significantly enhancing a stage effect of the karaoke event. Conventionally, the background picture is presented coincidentally with sounding of a karaoke accompaniment of the requested song, and therefore the background picture is turned off when the karaoke event is ended. Consequently, in an idling state where a request is absent, the monitor displays nothing and the loudspeaker is held silent.

In order to fill such a dull and boring blank period, a separate cable broadcast or else may be turned on to sound a music or else. However, such a filler is rather uninteresting, and does not efficiently utilize the monitor in most occasions.

Aside from a stand-alone type of the karaoke apparatus, recently a karaoke network system has been developed such that a central station provides a requested song data to a local terminal composed of a karaoke apparatus through a communication line such as Integrated Service Digital Network (ISDN). In the system, the terminal karaoke apparatus can advantageously reduce a data storage volume as compared to the stand-alone karaoke apparatus. Further, the data storage can be readily updated through the communication line by adding a new entry song data. However, like the stand-alone karaoke apparatus, the terminal karaoke apparatus of the network system cannot fill the blank period by itself.

SUMMARY OF THE INVENTION

In order to solve the above noted drawbacks of the prior art, an object of the present invention is to provide a karaoke network system in which a central station can manage local terminals through a communication line to efficiently and interestingly fill an idling time at each local terminal. Another object of the invention is to provide a karaoke apparatus suitable for use as a local terminal of such a karaoke network system.

According to the present invention, a karaoke network system comprises a central station for providing a data, and a local terminal connected to the central station through a communication line for presenting an event according to the provided data and being switchable between a working state and an idling state in response to a request. The central station comprises means responsive to a call from the local terminal for serving a song data representative of a karaoke event to the local terminal through the communication line, and means for down-loading a program data which sequentially prescribes spare events into the local terminal through the communication line. The local terminal comprises means operative in the working state where a request is present for presenting the karaoke event based on the provided song data, and means operative in the idling state where a request is absent for sequentially presenting the spare events according to the down-loaded program data so as to fill a blank period of the idling state.

In a practical form, the central station prepares the program data listing spare events selected from a commercial advertisement, an introduction of new songs, a demonstration of entry songs and so on, which have commercial service values in contrast to a mere broadcasted music. The central station can routinely provide the program data to all of the local terminals during a nonbusy period such as a daytime without a specific calling from each local terminal. Alternatively, the central station may provide the program data individually to each local terminal upon a calling therefrom. In turn, the local terminal initializes the program data to present the spare events everywhere the working state is switched to the idling state. Alternatively, the local terminal may continue the program data in straight throughout occurrences of the idling state.

According to the invention, a karaoke terminal apparatus connectable to a central station through a communication line for presenting an event in response to a request according to a data provided from the central station, comprises input means for inputting each request of a desired karaoke event, output means for outputting sound and/or image presentation of each event, first memory means for storing a song data provided from the central station and being representative of a karaoke event, second memory means for storing a program data down-loaded from the central station and being sequentially prescriptive of spare events, third memory means for registering the inputted request, first control means operative when the registered request is present in the third memory means for retrieving a corresponding song data from the first memory means and for controlling the output means to present a karaoke event based on the retrieved song data, and second control means operative when the registered request is absent in the third memory means for controlling the output means to sequentially present the spare events according to the program data stored in the second memory means.

In a practical form, the output means comprises sound synthesizer means for synthesizing an instrumental accompaniment of the karaoke event according to accompaniment information contained in the song data, and graphic synthesizer means for synthesizing lyric characters of the same karaoke event according to lyric information contained in the same song data. The graphic synthesizer means further forms a background picture of the karaoke event according to picture information contained in the song data. The output means having such a function can be efficiently utilized to present the spare event involving a music sound, a character display and a picture display in manner similar to the karaoke event.

In operation of the inventive karaoke network system, the central station functions to serve a requested song data and other data to the local terminal through the communication line so that the central station can manage the data used in the local terminal. Namely, the central station down-loads a program data in the form of a schedule file which prescribes a list of the spare events, into the local terminal. The local terminal operates in the idling state where a request of entry song is absent for sequentially presenting the spare events according to the schedule file. Consequently, the inventive karaoke network system can provide valuable services to fill a blank period of the idling state in addition to the regular karaoke service.

DETAILED DESCRIPTION OF THE INVENTION

Figure 1:
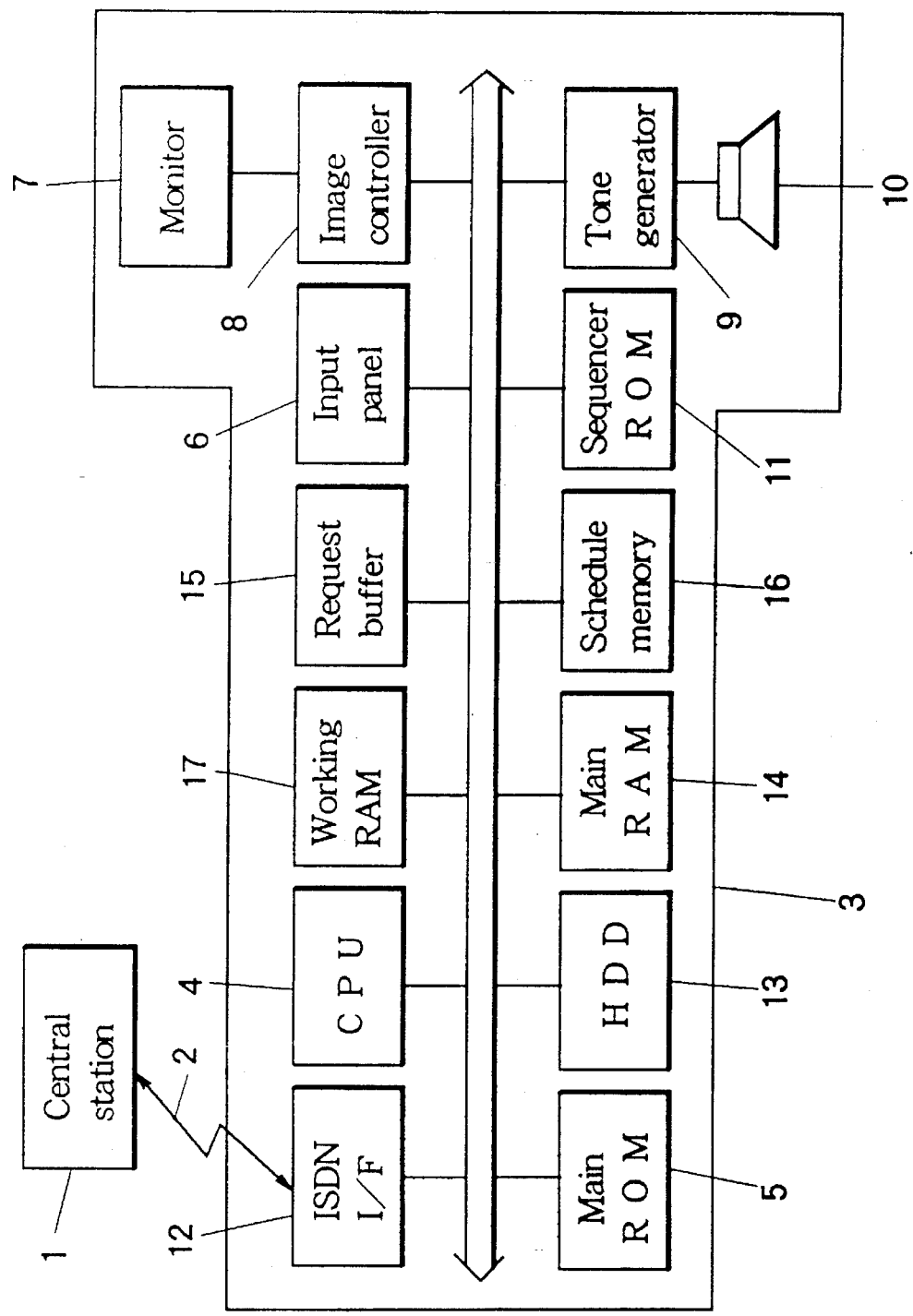
FIG. 1 is a block diagram showing one embodiment of the inventive karaoke network system.

Hereinafter, one embodiment of the invention will be described in conjunction with the drawings. Referring to FIG. 1, the inventive karaoke network system is comprised of a host central station 1 for providing a data, and at least one local terminal 3 composed of a karaoke apparatus connected to the central station 1 through a communication line 2 for presenting an event according to the provided data. The central station 1 has a database to store numerous pieces of song data, and responds to a calling from the local terminal 3 for providing thereto a desired song data representative of a karaoke event through the communication line 2. The communication line 2 may be comprised of a fast cable network such as ISDN. Each song data contains accompaniment information, lyric information, picture information and other effect control information in a sequential format effective to present a karaoke event. The central station 1 may routinely down-load a song data of a new entry song to the local terminal 3 instead of serving a new song data in response to the calling from the local terminal 3. Further, the central station 1 routinely down-loads a program data, i.e., a schedule file which sequentially prescribes spare events into the local terminal 3.

On the other hand, the local terminal 3 is switchable between a working state and an idling state in response to a request of a desired entry song by a user. The local terminal 3 operates in the working state where a request is present for presenting the karaoke event based on the served song data, and otherwise operates in the idling state where a request is absent for sequentially presenting the spare events according to the down-loaded schedule file to thereby fill a blank period of the idling state.

In detail, the local terminal 3 includes a CPU 4 for conducting overall control of the karaoke apparatus, and a main ROM 5 for storing control instructions executed by the CPU 4. An input panel 6 is provided to input various commands such as a request of a desired entry song by the user. A monitor 7 such as CRT is provided to display lyric characters and background pictures involved in the karaoke event. An image controller 8 is connected to the monitor 7. A tone generator 9 is provided for generating a tone signal according to the accompaniment information such as MIDI data contained in the song data. A loudspeaker 10 converts the tone signal into an instrumental accompaniment involved in the karaoke event. Thus, the monitor 7, image controller 8, tone generator 9 and loudspeaker 10 altogether constitute output means for outputting sound and image presentation of events. Particularly, the tone generator 9 functions as a sound synthesizer to synthesize the instrumental accompaniment, while the image controller 8 functions as an image synthesizer to synthesize the lyric characters according to the lyric information contained in the song data and to form the background picture according to the picture information contained in the song data. A sequencer ROM 11 stores sequence instructions executed by the CPU 4 to control the image synthesis and the sound synthesis in synchronous manner with each other according to sequence control information contained in the song data.

An ISDN interface 12 functions as a two-way communication port connectable to the ISDN communication line 2. A hard disk 13 is provided to store numerous pieces of the song data served from the central station 1. A main RAM 14 is provided to develop various data and instructions. A request buffer 15 is provided to register the inputted requests, such that already attended old requests are erased while new requests are written to thereby keep only alive requests. Further, though not shown in the figure, a microphone is provided to pick up a live vocal performance by a player, and a mixer is provided to mix the live vocal performance with the instrumental accompaniment of the karaoke event. In another form, the main ROM 5 and the sequencer ROM 11 may be integrated into one chip device.

As characterizing components of the inventive karaoke terminal apparatus, a schedule memory 16 is installed to store the schedule file down-loaded from the central station 1 for filling a blank period of the idling state with spare events.

Further, a working RAM 17 is prepared to memorize an addressing mode of the schedule file or an order of the spare events to be presented in a coming idling state. In operation, the down-loaded schedule file is transferred from the schedule memory 16 to the main RAM 14 for use in the idling state. In another form, a schedule file area may be set up in the hard disk 13 in place of the separate schedule memory 16.

Figure 2:
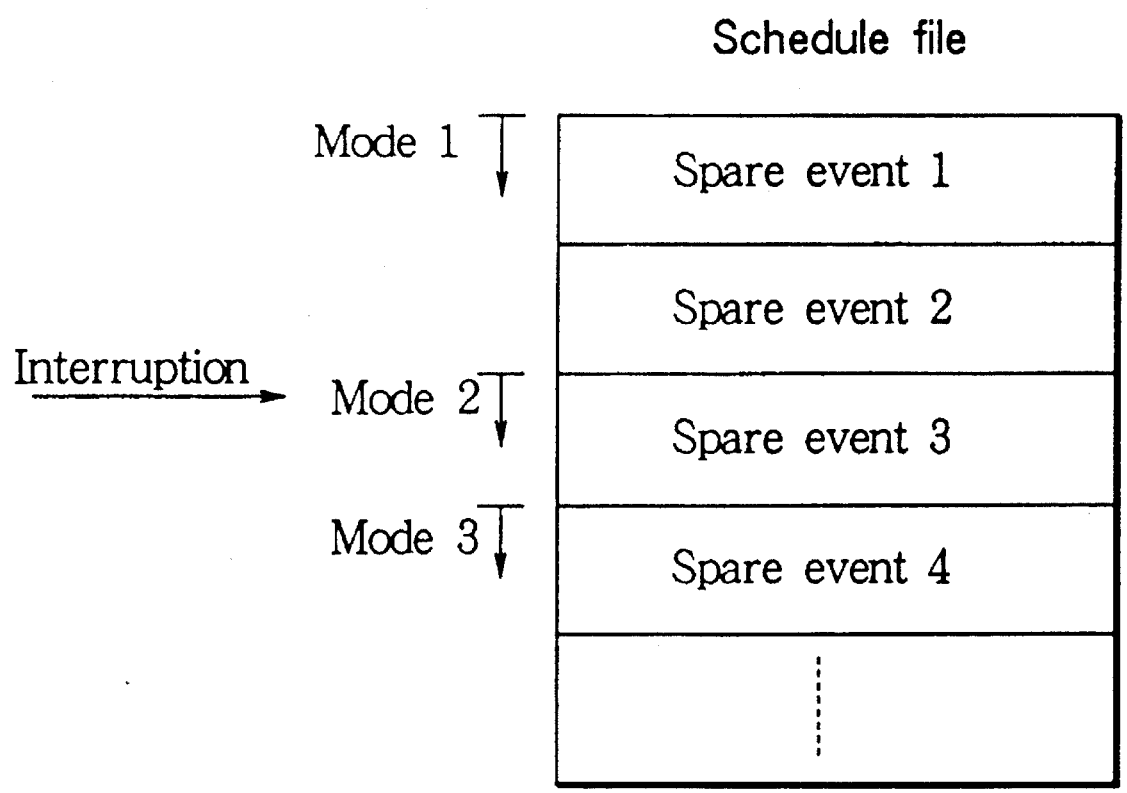
FIG. 2 is a schematic diagram showing one example of a schedule file.

FIG. 2 shows one example of the schedule file format. The schedule file sequentially prescribes spare events. Namely, the blank period is filled sequentially by Spare event 1, Spare event 2, Spare event 3, . . . , in this order. The central station 1 can freely prepare and organize various types of spare events such as a commercial advertisement, an introduction of newly released songs, a demonstration of entry songs, a TV game and else, which may involve music sound, character display, picture display and else. On the other hand, the local terminal 3 accesses and processes the schedule file according to designated one of addressing modes. Namely, if Mode 1 is designated, the local terminal initializes the program data everywhere the working state is switched to the idling state such that the first Spare event 1 is started at the top of every blank period, as shown in FIG. 2. If Mode 2 is designated, the local terminal continues the schedule file in straight throughout occurrences of idling states. For example, as shown in FIG. 2, when the Spare event 3 is interrupted during a previous blank period, the same Spare event 3 is again presented at the top of a next blank period. Alternatively, if Mode 3 is designated, the next Spare event 4 is presented in place of the last Spare event 3 which is interrupted in the previous blank period.

In operation of the inventive karaoke network system, the central station 1 routinely down-loads the schedule file into the schedule memory 16 of the local terminal 3 through the communication line 2 in a daytime, because the karaoke apparatus is normally busy in a nighttime. During the nighttime, every request from players is registered in the request buffer 15, while the central station 1 is called to supply song data corresponding to every request if such is not reserved in the hard disk 13. Then, the CPU 4 operates when the registered request is present in the request buffer 15 for retrieving the song data from the hard disc 13 and for controlling the image controller 8 and the tone generator 9 to present a karaoke event based on the retrieved song data. Occasionally, when the CPU 4 detects that the registered request is absent in the request buffer 15, the CPU 4 controls the image controller 8 and the tone generator 9 to sequentially present the spare events of the schedule file which is developed in the main RAM 14 according to the addressing mode memorized in the working RAM 17 to thereby fill the blank period. When the idling state is switched back to the working state by inputting of new requests, the presentation of the spare event is interrupted and the karaoke event is commenced.

As described above, according to the invention, the central station having a server function is connected to local terminals of the karaoke apparatus through a communication line to construct the karaoke network system. The central station down-loads into the local terminal the schedule file which sequentially describes spare events, while the local terminal sequentially presents the spare events in the idling state where the request is absent. By such a construction, the central station can manage the local terminal to enable the same to efficiently fill the blank period with commercially valuable services.

What is claimed is:

1. A karaoke network system comprising a central station for serving a data, and a local terminal connected to the central station through a communication line for presenting an event according to the served data and being switchable between a working state and an idling state in response to a request, wherein the central station comprises means responsive to a call from the local terminal for serving a song data representative of a karaoke event to the local terminal through the communication line, and means for down-loading a program data which sequentially prescribes spare events into the local terminal through the communication line, and the local terminal comprises means operative in the working state where a request is present for presenting the karaoke event of a requested song based on the served song data, and means operative in the idling state where a request is absent for sequentially presenting the spare events according to the down-loaded program data so as to fill a blank period of the idling state.

2. A karaoke network system according to claim 1, wherein the means for down-loading includes means for preparing the program data which prescribes spare events selected from a commercial advertisement, an introduction of new songs, a demonstration of entry songs, and a TV game.

3. A karaoke network system according to claim 1, wherein the means operative in the idling state includes means for initializing the program data everywhere the working state is switched to the idling state.

4. A karaoke network system according to claim 1, wherein the means operative in the idling state includes means for continuing the program data throughout occurrences of the idling state.

5. A karaoke terminal apparatus connectable to a central station through a communication line for presenting an event in response to a request according to a data served from the central station, the apparatus comprising:

input means for inputting each request of a desired karaoke event;

output means for outputting sound and/or image presentation of each event;

first memory means for storing a song data served from the central station and being representative of a karaoke event;

second memory means for storing a program data downloaded from the central station and being sequentially prescriptive of spare events;

third memory means for registering the inputted request;

first control means operative when the registered request is present in the third memory means for retrieving a corresponding song data from the first memory means and for controlling the output means to present a karaoke event based on the retrieved song data; and second control means operative when the registered request is absent in the third memory means for controlling the output means to sequentially present the spare events according to the program data stored in the second memory means.

6. A karaoke terminal apparatus according to claim 5, wherein the output means comprises sound synthesizer means for synthesizing an instrumental accompaniment of the karaoke event according to accompaniment information contained in the song data, and graphic synthesizer means for synthesizing lyric characters of the same karaoke event according to lyric information contained in the same song data.

7. A karaoke terminal apparatus according to claim 6, wherein the graphic synthesizer means includes means for forming a background picture of the karaoke event according to picture information contained in the song data.

8. A karaoke terminal apparatus according to claim 5, wherein the output means comprises means for presenting the spare event involving at least one of music sound, character display and picture display.

9. A karaoke network system comprising a central station for providing data, and a local terminal connected to the central station through a communication line for presenting an event according to the served data and being switchable between a working state and an idling state in response to a request, wherein the central station includes a transmitter that provides song data representative of a karaoke event to the local terminal through the communication line, and downloads program data which sequentially prescribes spare events into the local terminal through the communication line, and the local terminal includes a CPU operative in the working state to present the karaoke event of a requested song based on the provided song data when a request is present, and which is operative in the idling state to sequentially present the spare events according to the down-loaded program data so as to fill a blank period of the idling state when a request is absent.

10. A karaoke network system according to claim 9, wherein the central station includes means for preparing the program data which prescribes spare events selected from a commercial advertisement, an introduction of new songs, a demonstration of entry songs, and a TV game.

11. A karaoke network system according to claim 9, wherein the CPU operative in the idling state includes means for initializing the program data whenever the working state is switched to the idling state.

12. A karaoke network system according to claim 9, wherein the CPU operative in the idling state includes means for continuing the program data throughout occurrences of the idling state.

13. A karaoke terminal apparatus connectable to a central station through a communication line for presenting an event in response to a request according to a data served from the central station, the apparatus comprising:

an input circuit that inputs each request of a desired karaoke event;

an output circuit that outputs sound and/or image presentation of each event;

a first memory devices that stores song data provided from the central station and being representative of a karaoke event;

a second memory device that stores program data downloaded from the central station and being sequentially prescriptive of spare events;

a third memory device that registers the inputted request;

a first control circuit operative when the registered request is present in the third memory device for retrieving a corresponding song data from the first memory device and for controlling the output circuit to present a karaoke event based on the retrieved song data; and a second control circuit operative when the registered request is absent in the third memory device for controlling the output circuit to sequentially present the spare events according to the program data stored in the second memory device.

14. A karaoke terminal apparatus according to claim 13, wherein the output circuit includes a sound synthesizer that synthesizes an instrumental accompaniment of the karaoke event according to accompaniment information contained in the song data, and a graphic synthesizer that synthesizes lyric characters of the same karaoke event according to lyric information contained in the same song data.

15. A karaoke terminal apparatus according to claim 14, wherein the graphic synthesizer includes a circuit that forms a background picture of the karaoke event according to picture information contained in the song data.

16. A karaoke terminal apparatus according to claim 13, wherein the output circuit includes means for presenting the spare event involving at least one of music sound, character display and picture display.

17. A karaoke network system according to claim 1, wherein the local terminal further comprises means for memorizing an addressing mode of the program data to determine an order of the spare events to be presented in a next idling state.

18. A karaoke network system according to claim 9, wherein the local terminal further includes a memory device that stores an addressing mode of the program data to determine an order of the spare events to be presented in a next idling state.

\* \* \* \* \*